United States Patent
Ladebeck et al.

(10) Patent No.: US 8,188,436 B2
(45) Date of Patent: May 29, 2012

(54) BACKGROUND SIGNAL SUPPRESSION IN PET SPECTRUMS

(75) Inventors: Ralf Ladebeck, Erlangen (DE); Markus Vester, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 264 days.

(21) Appl. No.: 12/591,003

(22) Filed: Nov. 4, 2009

(65) Prior Publication Data

US 2010/0108895 A1    May 6, 2010

(30) Foreign Application Priority Data

Nov. 5, 2008    (DE) .......................... 10 2008 055 922

(51) Int. Cl.
*G01T 1/164* (2006.01)
(52) U.S. Cl. .............. 250/363.03; 250/269.4; 250/395
(58) Field of Classification Search ............... 250/269.4, 250/395, 363.03
See application file for complete search history.

(56) References Cited

U.S. PATENT DOCUMENTS

| | | | |
|---|---|---|---|
| 7,634,061 B1* | 12/2009 | Tumer et al. | 378/98.9 |
| 7,818,047 B2* | 10/2010 | Tumer et al. | 600/436 |
| 2004/0188623 A1 | 9/2004 | Breeding et al. | |

FOREIGN PATENT DOCUMENTS

| DE | 102008003141 A1 | 8/2008 |
|---|---|---|
| EP | 0396464 A2 | 11/1990 |

* cited by examiner

*Primary Examiner* — David Porta
*Assistant Examiner* — Hugh H Maupin
(74) *Attorney, Agent, or Firm* — Harness, Dickey & Pierce, P.L.C.

(57) ABSTRACT

A method and a facility are disclosed for imaging a PET spectrum with a PET detector, especially a PE-MR tomograph, and evaluation of the PET spectrum. To improve the correction of the base line in PET and thereby to improve the energy resolution for the PET images, at least one embodiment of the facility includes: a sampling facility for sampling the output signal of the PET detector at a predetermined sampling rate; an edge discriminator for recognizing at least one edge of a PET pulse; a background signal discriminator for estimating a background signal under the PET pulse; and an integrator device for determining the energy of the PET pulse in the PET spectrum above of the background signal from the sample values of the sampling facility.

13 Claims, 3 Drawing Sheets

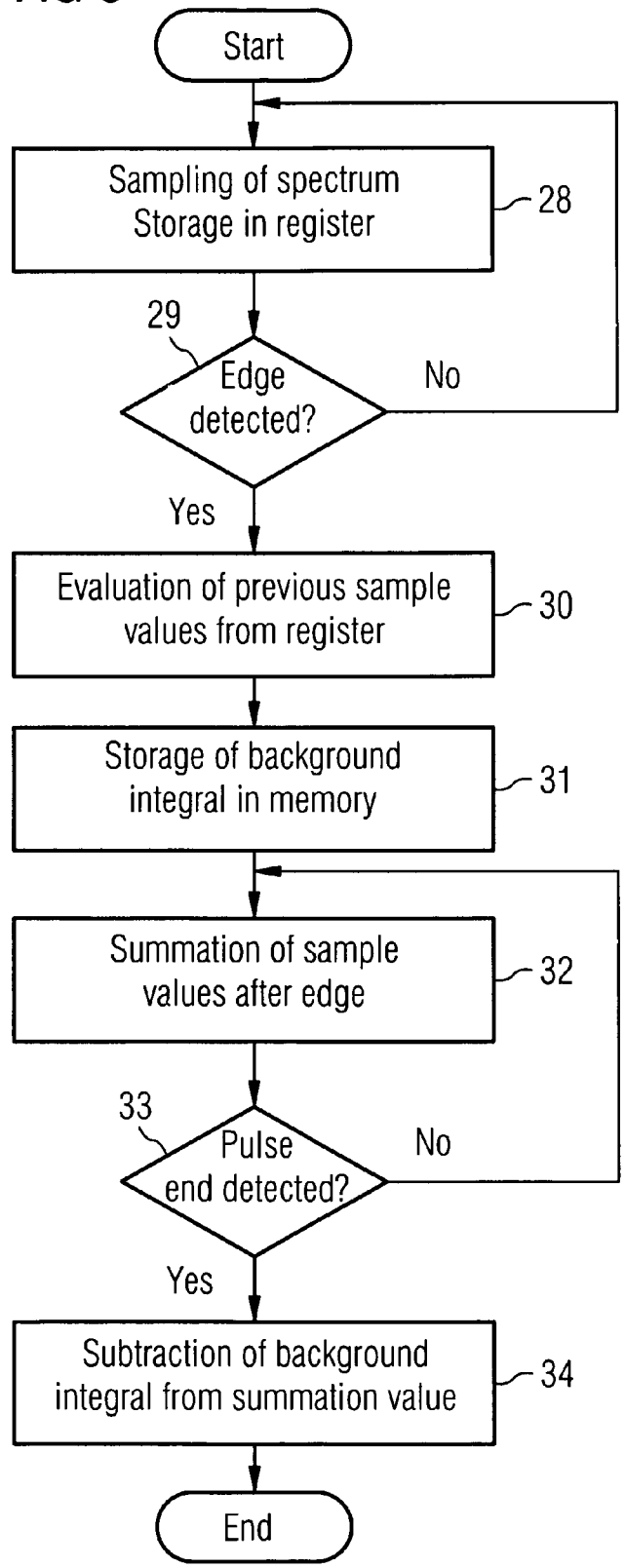

BACKGROUND SIGNAL SUPPRESSION IN PET SPECTRUMS

PRIORITY STATEMENT

The present application hereby claims priority under 35 U.S.C. §119 on German patent application number DE 10 2008 055 922.9 filed Nov. 5, 2008, the entire contents of which are hereby incorporated herein by reference.

FIELD

At least one embodiment of the invention generally relates to the suppression of background signals in PET spectrums and especially, but not exclusively, to the imaging of a PET spectrum with a PET detector of a PE-MR tomograph.

BACKGROUND

With combined Positron Emission tomography (PET)-Magnetic Resonance (MR) devices the same volume is to be mapped simultaneously in two ways: Physiological processes are to be represented and at the same time the localization of the physiological processes in the body with high accuracy is to be possible. To do this, corresponding anatomical information must be available. For the physiological information Positron Emission Tomography (PET) images are made, for the anatomical information Magnetic Resonance (MR) images are made.

For a PET image the 511 keV photons emitted from the area under examination are verified with scintillation counters. These essentially comprise a scintillation crystal such as Bismuth Germanate (BGO) for example, onto which a high-sensitivity photodiode, e.g. an Avalanche Photo Diode (APD), is glued. Their output signals are processed in a directly-connected preamplifier and routed outwards. The noise is removed from the processed signal and for identification of true 511 keV photons in the spectrum the energy of the signal must be determined.

For an MR image strong magnetic fields are generated in the area under examination, in which the spins of the atomic nuclei align themselves. After irradiation of a high-frequency field into the area under examination through which the spins are disturbed in their previously ordered alignment, the decay behavior of the high frequency radiation emitted when the spins return to their aligned state is investigated. For local resolution parallel to the magnetic field lines gradient fields are superimposed onto the main magnetic field.

Since PET and MR imaging are undertaken at the same time at the same location, the PET components must be insensitive to the strong magnetic fields that are generated by the MR components. In particular in such cases the gradient fields of the MR imaging unit are to be considered which induce currents into the PET detector electronics. If for example preamplifiers are used for the APDs, the connections between APD and preamplifier can capture signals generated by the gradient fields. Such faults can never be entirely excluded, even by particular arrangements of the components in the electronic circuits.

The noise signals form the background in the PET spectrum, onto which the individual PET signals are superimposed. An especially large proportion of the background is contributed in such cases by the switching noise of the amplifiers for the gradient magnets. The faults caused by the switching noise are of low frequency compared to the actual PET signals and make themselves evident as drift or as low-frequency fluctuations of the zero point or the base line.

In the prior art, for improved detection of the pulse heights of the PET signal, an attempt is made to keep the base line constant. This is designed to eliminate an "offset" of the signal, through which otherwise the energy resolution of the PET components would be adversely affected. It is not always possible to keep the base line constant however since not all influences are predictable. In addition the stabilization of the base line requires a high outlay.

SUMMARY

In at least one embodiment of the invention, the correction of the base line for PET spectrums is improved and thereby the energy resolution for the PET images is improved.

At least one embodiment of the invention is based on the fact that the background signal of the PET signals is emulated and subtracted from the overall signal. For emulation of the background signal a (short) interval is recorded before the actual PET signal and where necessary an interval after the PET signal. The background signal is determined from the signal that was detected in this directly adjacent interval. After the integration of the PET signal the surface below the background signal is subtracted from the integral value.

In this way the "foundation" of the basic noise under the actual PET signal is always obtained independently of any possible drift of the background signal. This foundation can be subtracted from the PET signal and thus the energy of the PET signal can be determined very exactly.

At least one embodiment of the inventive method is for imaging a PET spectrum with a PET detector, especially a PET-MR tomograph, and evaluating the PET spectrum and includes at least the following steps: Sampling the output signal of the PET detector at a predetermined sampling rate using a sampling facility; Recognition of at least one edge of a PET pulse by an edge discriminator; Estimation of a background signal below the PET pulse by a background signal discriminator; Determination of the energy of the PET pulse in the PET spectrum above the background signal from the sample values of the sampling facility by an integrator device.

In example embodiments the inventive method has as a further feature or—where technically possible and meaningful—as a combination of further features that are provided as further steps: Generation of a leader interval of predetermined duration before a rising edge of the PET pulse by a window generator and estimation of the background signal of the PET pulse by the background signal discriminator as a function of the sample values in the leader interval;

Generation of a trailer interval of predetermined duration after a decay edge of the PET pulse by the window generator and estimation of the background signal of the PET pulse by the background signal discriminator as a function of the sample values in the trailer interval;

The background signal of the PET pulse is interpolated by the background signal discriminator as leader interval and trailer interval.

In at least one embodiment, the corresponding inventive facility for imaging a PET spectrum with a PET detector, especially a PET-MR tomograph, and evaluation of the PET spectrum includes: A sampling facility for sampling the output signal of the PET detector with a predetermined sampling rate; An edge discriminator for recognizing at least one edge of a PET pulse; a background signal discriminator for estimating a background signal below the PET pulse; An integrator device for determining the energy of the PET pulse in the PET spectrum above the background signal from the sample values of the sampling facility.

In example embodiments the inventive facility has as a further feature or—where technically possible and sensible—as a combination of further features, that a window generator generates a leader interval of a predetermined duration before the rising edge of the PET pulse and the background signal discriminator estimates the background signal of the PET pulse as a function of the sample values in the leader interval;

the window generator generates a trailer interval of predetermined duration after a decay edge of the PET pulse and the background signal discriminator estimates the background signal of the PET pulse as a function of the sample values in the trailer interval;

the background signal discriminator interpolates the background signal of the PET pulse from leader interval and trailer interval;

the edge discriminator is a constant fraction discriminator.

In at least one embodiment, the invention has the advantage inter alia of no additional filter having to be used with which a specific frequency band, especially the unknown frequency of the gradient fields, will be filtered out. In at least one embodiment, the inventive structure is almost completely independent of the frequency with which the fault occurs in the useful signal. This means that changes in the temporal behavior of the faults is also insignificant, and the PET signal can be measured and analyzed exactly, even in the presence of switching noise caused by gradient fields.

BRIEF DESCRIPTION OF THE DRAWINGS

Further features and advantages of the invention emerge from the following description of example embodiments, in which reference is made to the enclosed drawing.

FIG. 5 shows an embodiment of the inventive method in the form of a flow diagram.

DETAILED DESCRIPTION OF THE EXAMPLE EMBODIMENTS

Figure 1:
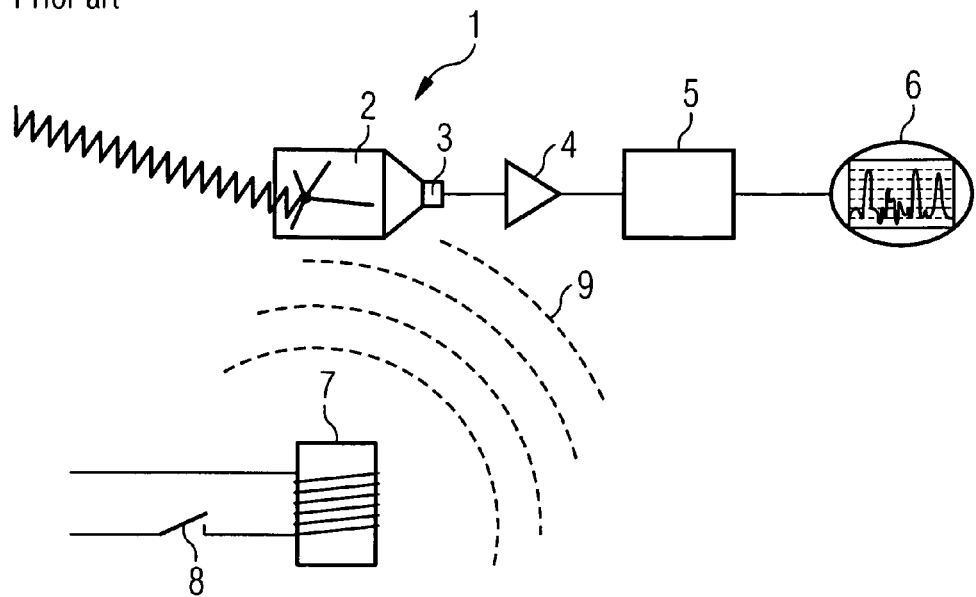
FIG. 1 shows a schematic diagram of the main components for the detection of a PET spectrum.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

MOM Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows the basic structure for the detection of a PET signal spectrum. Electromagnetic rays with an energy of 511 keV from a radioactive source (not shown in the figure) are captured in a PET detector 1, said rays being indicated in the figure as a line of waves coming from the left. In a scintillation crystal 2 of the PET detector the hard radiation at 511 keV is converted into visible light that is registered by an avalanche photo diode (APD) 3. The output signal of this APD 3 is processed in electronics 4 located in the vicinity of the APD 3, especially in a preamplifier for further processing. The actual evaluation of the signal takes place in evaluation electronics 5. The result of the signal processing and signal evaluation is displayed on a display device 6 as a spectrum or numerically.

Noise sources present in the environment influence the output signal of the APD 3 or of the downstream electronics. An example for noise sources of this type are magnets 7 for MR images which are especially switched during the PET detection. The switching of the magnets 7 is indicated in FIG. 1. by a switch 8. The switching 8 generates electromagnetic waves 9 which couple into the electronics 4 downstream of the APD and thus lead to falsified input signals at the evaluation electronics 5. These noise influences must be filtered out retrospectively in the evaluation electronics 5. The evaluation electronics 5 is designed in a manner appropriate to this function, as will be explained below with reference to FIG. 2.

Figure 2:
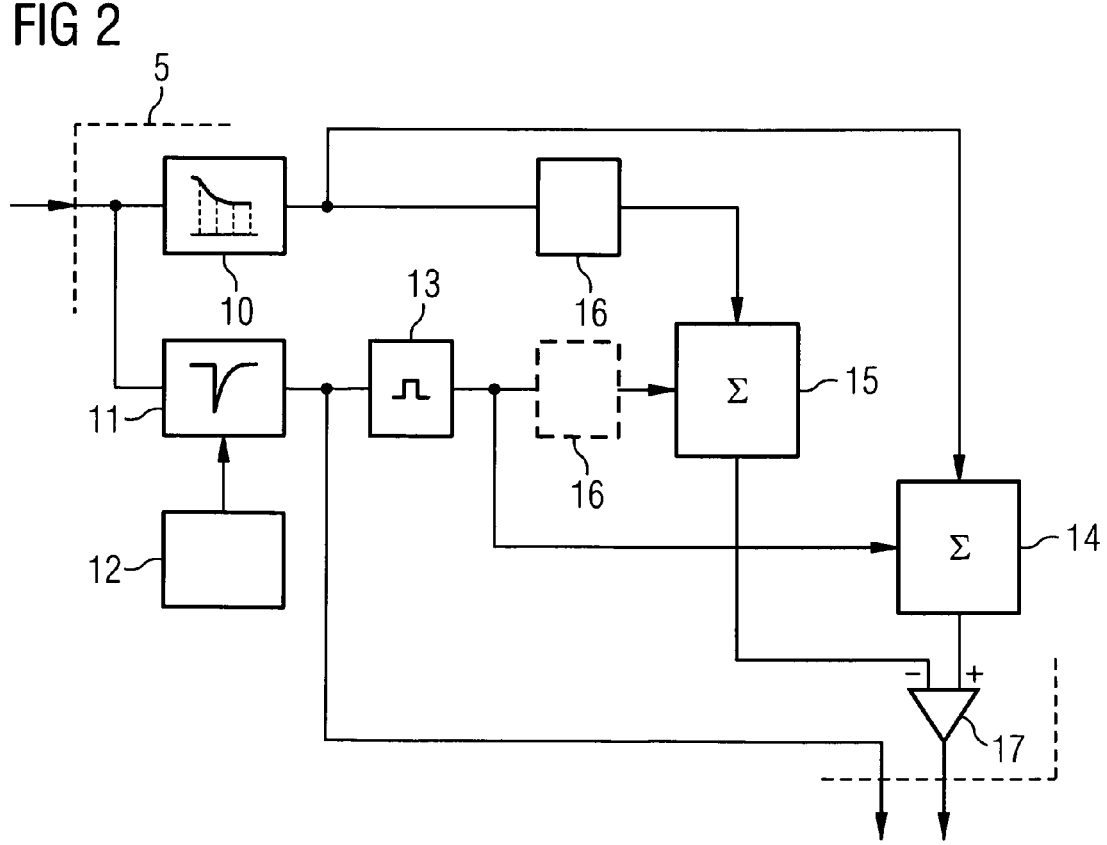
FIG. 2 shows a block diagram of an embodiment of the inventive facility.

FIG. 2. shows the evaluation electronics 5 with a sample hold element 10 at its input, in which the incoming signal from the APD 3 and preamplifier 4 is digitized. The analog signal is indicated in this figure as a solid line of which the amplitude will be sampled at given times. The result is a sequence of pulses with different heights. At the same time the input signal is investigated in an edge discriminator 11 for the presence of signal edges which show that a 511 keV photon has been registered by the APD 3. In this case the edge of the signal is assigned a time value to which the subsequent evaluation of the signal relates. It is clear to the person skilled in the art that the output voltage of the preamplifier 4 can basically be positive or negative at the leading edge of an event, i.e. can be a rising or a falling edge. No further consideration is given to this fact below, as embodiments of the invention are applicable in both cases.

For analysis of more widely-spaced PET pulses or events the edge discriminator 11 is connected to a central clock 12 that allows time intervals to be measured over longer periods. The time value of the event is output by the evaluation electronics 5 for numerical evaluation in a spectrum that is recorded over such a longer interval.

Depending on the time value for the rising edge that was detected by the APD 3, a time window is generated in which the signal can be analyzed. This time window is generated in the embodiment depicted in FIG. 2 in a window generator 13. After the window generator 13 has opened the time window, the sample values that will be output by the sample hold element 10 are summed in an integrator or summator 14, so that the overall surface below the PET pulse and thereby its energy is produced. In this case the window generator 13 keeps the time window open until such time as the edge discriminator 11 has recognized a further edge. The second edge indicates that the PET pulse is now decayed and the subsequent sample values no longer belong to the PET pulse. As soon as the window generator 13 has received this information from the edge generator 11, it closes the time window and the summator 14 ends the adding process. The result of the adding process will be output by the summator 14.

In order to be able to subtract the background from the total value for the surface below the PET pulse that was output by the summator or integrator 14, the background is determined in a second summator or integrator. To identify it better the second summator is referred to below as the background signal discriminator 15.

Inventively, for determination of the background signal, a time interval is observed which comes directly before or after the actual PET pulse. In FIG. 2 the case is initially explained with a leader interval.

In order during recognition of a rising (falling) edge of a PET pulse to still have access to the sample values in a leader interval directly before the actual PET pulse, the evaluation electronics 5 is provided with a delay link 16 in which the sample values are delayed in time by the sample hold element 10 before they are read in by the background signal discriminator 15. With this runtime delay in the delay link 16, the edge discriminator 11 obtains a certain timing advantage compared to the evaluation of the sample values by the sample hold element 10. Ideally the background signal discriminator 15 integrates the sample values from the sample hold element 10 over an interval that exactly corresponds to the duration of a true PET pulse. In this case both values are present at the same time at the output of the integrator 14 and at the output of the background signal discriminator 15 and can be subtracted from one another. Since the duration of the PET pulse is not however known precisely in advance, the background signal discriminator 15 can abort the integration after a fixed predetermined interval.

As a further alternative the background signal discriminator 15 can abort the integration when it receives a second edge signal from the window generator 13. The delay line 16 must be designed in the appropriate manner for this. In all cases the use of buffers can be necessary for the results of the integrator 14 and the background signal discriminator 15. The details for the conversion of the individual alternatives are known to the person skilled in the art and are not explained further here.

Similarly to the leader interval the possibility is also produced of using a time interval for the determination of the background signal that follows on directly from the PET pulse. In this case the sample values do not have to be read in delayed from the sample hold element 10 by the background signal discriminator 15 but the window signal from the window generator 13 must be read in delayed by the background signal discriminator 15. This alternate or additional possibility for using the leader intervals is shown in FIG. 2 by the delay link 16 indicated by a dashed line.

The integral value or sum value determined by the background signal discriminator 15 corresponds to the background signal of the actual PET pulse. In such cases it is taken as read that this value must where necessary also be weighted with the duration of the actual PET pulse. These details are also known to the person skilled in the art.

The sum value of the background signal is subtracted in a subtractor 17 from the sum value from the PET pulse, where necessary after appropriate weighting, so that at the output of the subtractor 17 a signal is present that corresponds to the surface below the PET pulse and thereby to the corrected energy of the PET pulse. This signal will where necessary be represented with the time signal from the edge discriminator 11 in the display device 6. The result after this signal processing will be explained below on the basis of FIGS. 3 and 4.

Figure 3:
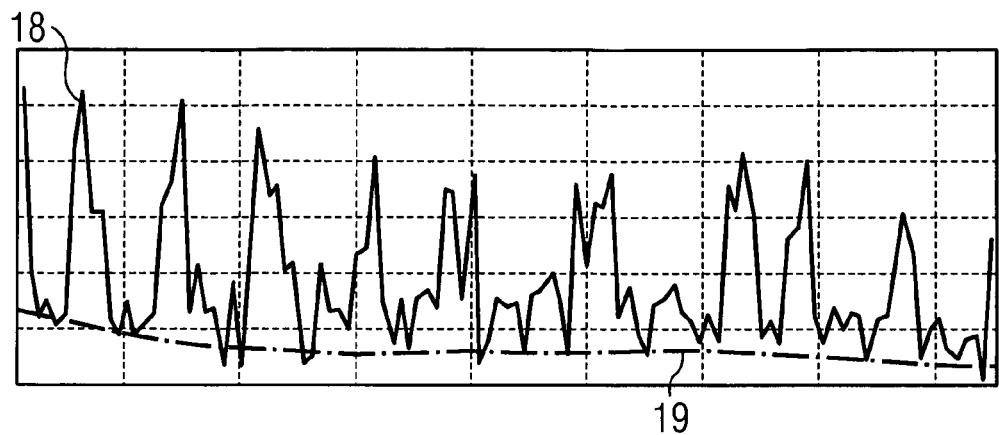
FIG. 3 shows an example for a real PET spectrum.

A typical PET spectrum 18 is shown in FIG. 3. Clearly visible in the diagram is that the actual signal of the PET detector is superimposed onto a background signal, of which the interpolated curve is shown as a broken line 19. The background signal is generated in a combined PET-MR facility especially by switched magnetic fields. In such cases the gradient fields of the MR tomograph make the largest contribution. The curve of the gradient fields in a MR imaging facility is as a rule trapezoidal for one of the three axes with a respective duration of a few milliseconds. The current needed for generation of the gradient fields will usually be generated by a switched-mode amplifier which is operated at a switching frequency of appr. 40 kHz. The switching of the switched-mode amplifier is the reason for the switching noise in the spectrums.

Figure 4:
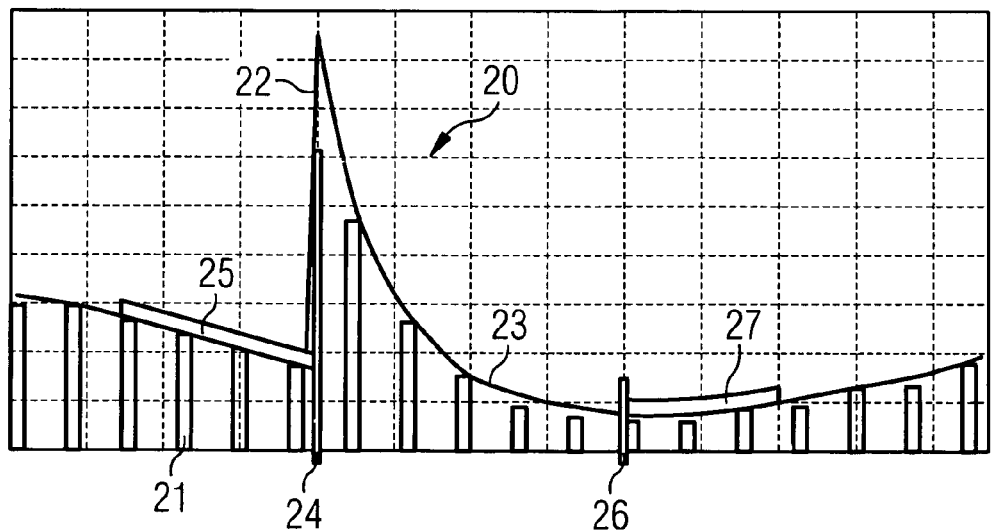
FIG. 4 shows the idealized curve of a PET signal with background component and actual PET signal.

Inventively the amplitude and phase of the noise signals is detected in the time interval before the PET signals. FIG. 4 shows a single PET signal with background signal idealized in its signal curve. The signal curve 20 is essentially subdivided into the three sections before, during and after the PET pulse. The signal curve 20 is continuously sampled and is represented and processed as a sequence of sample values 21. The rising edge 22 of the pulse is assigned a time value 24 to which both the analysis of the PET pulse itself and also the determination of the background signal relates. The sample values 21 will be analyzed in a leader interval 25 before the time value 24 of the rising edge 22. For this purpose the time interval with a duration of a few microseconds before the point in time of the PET pulse defined by the constant fraction discriminator is considered. Preferably the signal is sampled uninterrupted for this purpose and evaluated as a function of the signal of the edge discriminator 11 (trigger). Because of the low frequency of the gradient field 9, the background signal can be extrapolated from the leading edge of the PET signal. In particular the sample values 21 are summed by the background signal discriminator 15 as described above, so that a value for the signal background signal, which must be subtracted from the entire surface under the PET pulse, is obtained in order to provide a good approximation of the actual surface content of the PET pulse.

Similarly the background signal can however also be corrected with a value which was determined from the interval after decay of the PET pulse. To this end the falling edge 23 is assigned a time value 26. The sample values 21 that are read in after this time value 26 are likewise regarded as background signals so that from them in turn an estimation of the background can be derived. The corresponding trailer interval is labeled 27 in FIG. 4.

It is obvious to the person skilled in the art that both the leader interval 25 and also the trailer interval 27 can be used in isolation for the estimation of the background signal. Limiting the process to one of the intervals is especially sufficient and advantageous in relation to the necessary computing outlay if the background is relatively stable. On the other hand—as indicated by the line 19 in FIG. 3—low-frequency fluctuations or a drift of the background are not basically able to be excluded, so that a more exact estimation can be achieved by both the sample values in the leader interval and also the sample values in the trailer interval being included for the determination of the background. In particular the background is then determined by interpolation of the two intervals.

As emerges directly from the idealized curve 20 of the signal in FIG. 4, the point in time 24 and 26 may not be dependent on the respective amplitude of the PET signal. Thus the point in time 24 and 26 is determined with the aid of a constant fraction discriminator (CFD) in which the incoming signal is overlaid with its defined delayed inverse and the constant fraction of the overall signal is used for the definition of the time value. This point in time is assigned to the PET signal and viewed as its time of origination. This means that it is possible to define the time interval 25 directly before the actual PET signal pulse in which the gradient fields and other faults can be detected. The same applies to the time interval 27 directly after the actual PET pulse.

An embodiment of the method for detection of the zero line and subsequent subtraction of the signal caused by the gradient fields from the actual PET signal is explained on the basis of the flow diagram depicted in FIG. 5.

In step 28 the spectrum of the APD 3 is sampled continuously, and the sample values are stored in a register. This register can be a shift register in which, depending on the register width, a predetermined number of sample values is always buffered that will gradually be overwritten by newer sample values. Such a register allows previous sample values to be accessed even retroactively.

As soon as in step 29 an edge of the sampled input signal is recognized, the signal before and after this point in time will be analyzed. In step 30 the sample values in the leader interval before the triggering edge will be processed as described in connection with FIGS. 2 and 4. As a result of the use of a shift register it is possible to access previous values for the analysis of the leader interval. The shift register thus "replaces" the delay line(s) 16 in accordance with FIG. 2. Since in addition the most up-to-date value always occupies the first position in the shift register, instead of the window generator 13 the summation can be executed over the entire width of the register. This means that the window generator 13 in FIG. 2 can be omitted.

The background signal determined in step 30 is stored in step 31 in a buffer (not shown in the figure) in order to enable it to be subtracted later in the course of the method from the overall result of the PET pulse.

In step 32 the sample values that were read in after the edge are summed. This sum thus represents the entire surface content under the PET pulse. Both the actual output signal of the APD 3 which was caused by a positron annihilation and also the background noise that was especially caused by gradient fields belong to the surface content.

The integration of the PET pulse ends in step 33, as soon as the end of the PET pulse was recognized. This can once again be defined by a constant fraction discriminator.

As soon as the result of the zero line integration and the result of the pulse integration are available, the zero line is subtracted from the pulse, so a that a markedly improved energy resolution of the PET detection is achieved. The method thus involves a dynamic zero point adaptation or zero point adjustment.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE SYMBOLS

1 PET detector
2 Scintillation crystal
3 (Avalanche) photodiode
4 Preamplifier
5 Evaluation electronics
6 Display device
7 Gradient magnets
8 Switch
9 Gradient field, electromagnetic noise field
10 Sample & hold element
11 Edge discriminator
12 Central clock (master clock)
13 Window generator
14 Integrator
15 Background signal discriminator
16 Delay link (delay)
17 Subtractor
18 PET spectrum
19 Background line
20 Idealized signal curve
21 Sample values of the signal curve
22 Rising edge of a PET pulse
23 Decay edge of the PET pulse
24 Time value t1 of rising edge of the PET pulse
25 Signal curve in leader interval before the time value t1
26 Time value t2 of decay edge of the PET pulse
27 Signal curve in trailer interval after the time value t2
28 Sampling of spectrum and storage of sample values in register
29 Interrogation: edge recognized?
30 Evaluation of the previous sample values in register
31 Storage of background integral in memory
32 Summation of sample values after edge
33 Interrogation: pulse end recognized?
34 Subtraction of background signal from sum value

What is claimed is:

1. A method comprising:
sampling an output signal of a PET detector at a sampling rate to generate sample values, using a sampling facility;
recognizing at least one edge of a PET pulse, using an edge discriminator, the at least one edge of a PET pulse including a rising edge;
generating a leader interval of a duration before the rising edge of the PET pulse, using a window generator;
estimating a background signal under the PET pulse, using a background signal discriminator, the estimating including estimating the background signal of the PET pulse, using the background signal discriminator, as a function of the sample values in the generated leader interval; and
determining an energy of the PET pulse in a PET spectrum above the estimated background signal from the sample values of the sampling facility, using an integrator device.

2. The method as claimed in claim 1, wherein the at least one edge of a PET pulse includes a decay edge, the method further comprising:
generating a trailer interval of a duration after the decay edge of the PET pulse, using the window generator, wherein the estimating includes estimating the background signal of the PET pulse by the background signal discriminator as a function of the sample values in the generated trailer interval.

3. The method as claimed in claim 2, wherein the background signal of the PET pulse is interpolated by the background signal discriminator from the leader interval and the trailer interval.

4. The method as claimed in claim 1, wherein the background signal of the PET pulse is interpolated by the background signal discriminator from the leader interval.

5. A method comprising:
sampling an output signal of a PET detector at a sampling rate to generate sample values, using a sampling facility;

recognizing at least one edge of a PET pulse, using an edge discriminator, the at least one edge of a PET pulse including a decay edge;

generating a trailer interval of a duration after the decay edge of the PET pulse, using the window generator;

estimating a background signal under the PET pulse, using a background signal discriminator; and determining an energy of the PET pulse in a PET spectrum above the estimated background signal from the sample values of the sampling facility, using an integrator device, wherein the estimating includes estimating the background signal of the PET pulse by the background signal discriminator as a function of the sample values in the generated trailer interval.

6. The method as claimed in claim 5, wherein the background signal of the PET pulse is interpolated by the background signal discriminator from the trailer interval.

7. A facility, comprising:

a sampling facility to sample an output signal of a PET detector at a sampling rate to generate sample values;

an edge discriminator to recognize at least one edge of a PET pulse, the at least one edge of a PET pulse including a rising edge;

a window generator to generate a leader interval of duration before the rising edge of the PET pulse;

a background signal discriminator to estimate a background signal under the PET pulse, the background signal discriminator configured to estimate the background signal of the PET pulse as a function of the sample values in the leader interval; and an integrator device to determine an energy of the PET pulse in a PET spectrum above the estimated background signal from the sample values of the sampling facility.

8. The facility as claimed in claim 7, wherein the at least one edge of a PET pulse includes a decay edge, the facility further comprising a window generator to generate a trailer interval of duration after the decay edge of the PET pulse, wherein the background signal discriminator is further configured to estimate the background signal of the PET pulse as a function of the sample values in the trailer interval.

9. The facility as claimed in claim 8, wherein the background signal discriminator is configured to interpolate the background signal of the PET pulse from leader interval and trailer interval.

10. The facility as claimed in claim 7, wherein the edge discriminator is a constant fraction discriminator.

11. The facility as claimed in claim 7, wherein the background signal discriminator is further useable to interpolate the background signal of the PET pulse from leader interval.

12. A facility comprising:

a sampling facility to sample an output signal of a PET detector at a sampling rate to generate sample values;

an edge discriminator to recognize at least one edge of a PET pulse, wherein the at least one edge of a PET pulse includes a decay edge;

a background signal discriminator to estimate a background signal under the PET pulse;

a window generator to generate a trailer interval of duration after the decay edge of the PET pulse; and an integrator device to determine an energy of the PET pulse in a PET spectrum above the estimated background signal from the sample values of the sampling facility, wherein the background signal discriminator is configured to estimate the background signal of the PET pulse as a function of the sample values in the trailer interval.

13. The facility as claimed in claim 12, wherein the background signal discriminator is further configured to interpolate the background signal of the PET pulse from trailer interval.

* * * * *